UNITED STATES PATENT OFFICE.

HENRY A. ALDEN, OF MATTEAWAN, NEW YORK.

IMPROVED STUFFING FOR MATTRESSES.

Specification forming part of Letters Patent No. 41,589, dated February 16, 1864; Reissue No. 1,749, dated August 30, 1864.

*To all whom it may concern:*

Be it known that I, HENRY A. ALDEN, of Matteawan, in the county of Dutchess and State of New York, have invented certain new and useful Improvements in Stuffing of Mattresses, Chairs, and for other Articles of Furniture, Bedding, Carriages, &c.; and I hereby declare that the following is a full, clear, and exact description of the same.

For the stuffing of mattresses, sofas, chairs, for the seats and backs of carriages, and for other articles of furniture, bedding, &c., the material almost universally used is horse-hair, because of its softness, springiness, and other properties which render it peculiarly adapted to this purpose. The increasing price of horse-hair, however, has led to the employment of substitutes. Those most commonly in use are simply adulterations possessing the properties requisite for stuffing in a greater or lesser degree, according to the amount of pure horse-hair they contain. Certain vegetable fibers have been used, but with little success, because of their stiffness and coarseness, while their elasticity or springiness is soon destroyed by repeated compression to which it is exposed when used as a stuffing.

The object of my invention is to produce a substitute for horse-hair, which, while possessing the desirable qualities as a stuffing material with respect to elasticity, softness, and durability, shall have the additional advantage of being cheap, more easily worked, and capable of being cleansed or washed with the utmost facility; and my invention consists in the production, as a new article of manufacture, of mattresses, chair-seatings, and other articles of furniture, bedding, &c., in which the stuffing is composed of sponge prepared in the manner hereinafter described.

To enable others skilled in the art to make and use my invention, I shall now proceed to describe the manner in which the same is or may be carried into effect.

I take sponge in its raw state and thoroughly cleanse it—*i. e.*, free it from calcareous impurities or sand which it may contain. This is done by repeated washings, or by some chemical or mechanical process, or by a chemical and mechanical process combined. I prefer first to cut and wash the sponge for the purpose of removing the calcareous impurities in a stuff-engine or a picker. I then submit it to the action of muriatic acid in the stuff-engine, such as are used in paper-mills for reducing rags to a pulpy mass. If a stuff-engine be used, I adjust the revolving cutters relatively to the stationary cutter, so as to cut up the sponge into small pieces. When the sponge is thus reduced, it is dried in the shade or in the sun, or hot rollers or in a suitable oven, care being taken not to burn or singe it. The sponge is then in a condition fit to be used as a stuffing.

This stuffing has many advantages over those now in use. It is capable of being washed and dried, and when dry possesses softness combined with elasticity, so highly valued in horse-hair stuffing. It is also very useful for hospital purposes, as the beds may be washed and dried as often as required without injury.

Having now fully described my invention, I claim—

As a new manufacture, the production of mattresses, chair-seatings, and other articles of furniture, bedding, &c., in which the stuffing is composed of sponge prepared in the manner substantially as herein set forth.

In testimony whereof I have signed my name to this specification before two subscribing witnesses.

H. A. ALDEN.

Witnesses:
W. AL. VAN WYENER,
BARKER BUMP.